US012501316B2

(12) United States Patent
Stearn et al.

(10) Patent No.: US 12,501,316 B2
(45) Date of Patent: Dec. 16, 2025

(54) SPLIT RADIO TACTICAL DATA LINK TERMINAL

(71) Applicant: L3Harris Technologies, Inc., Melbourne, FL (US)

(72) Inventors: Jon E. Stearn, Carlsbad, CA (US); Sean K. Parker, Encinitas, CA (US); Charles A. Wolfe, Encinitas, CA (US); Peter C. Camana, La Mesa, CA (US); Stuart N. Shanken, San Diego, CA (US); Thomas J. Allen, Oceanside, CA (US)

(73) Assignee: L3Harris Technologies, Inc., Melbourne, FL (US)

( * ) Notice: Subject to any disclaimer, the term of this patent is extended or adjusted under 35 U.S.C. 154(b) by 307 days.

(21) Appl. No.: 18/243,522

(22) Filed: Sep. 7, 2023

(65) Prior Publication Data

US 2024/0089796 A1 Mar. 14, 2024

Related U.S. Application Data

(60) Provisional application No. 63/406,605, filed on Sep. 14, 2022.

(51) Int. Cl.
*H04W 28/08* (2023.01)
*H04W 72/0446* (2023.01)

(52) U.S. Cl.
CPC ... *H04W 28/0975* (2020.05); *H04W 28/0908* (2020.05); *H04W 72/0446* (2013.01)

(58) Field of Classification Search
CPC .. H04L 43/0852; H04L 1/1812; H04W 72/23; H04W 24/04; H04W 24/02; H04W 24/08; H04W 72/1273; H04W 52/08; H04W 52/228; H04W 52/50
See application file for complete search history.

(56) References Cited

U.S. PATENT DOCUMENTS

| 12,120,530 | B2* | 10/2024 | Thommana | H04W 88/10 |
| 12,289,243 | B2* | 4/2025 | Timmons | H04L 47/2475 |
| 2002/0197978 | A1* | 12/2002 | Zavidniak | H04W 12/122 |
| | | | | 455/410 |
| 2003/0117981 | A1* | 6/2003 | Tillotson | H04W 52/08 |
| | | | | 370/252 |
| 2009/0167513 | A1* | 7/2009 | Hill | G01S 5/0289 |
| | | | | 370/328 |

(Continued)

*Primary Examiner* — Jung Liu
(74) *Attorney, Agent, or Firm* — Fox Rothschild LLP; Carol E. Thorstad-Forsyth

(57) ABSTRACT

A Link 16 terminal. The Link 16 terminal includes a red enclave. The red enclave comprises a Link 16 radio. The Link 16 radio is configured to send commands to Link 16 modems. The commands specify time slots when operations in the commands should be performed by the Link 16 modems. The Link 16 terminal further includes a black enclave physically separated from the red enclave. The black enclave includes a Link 16 modem configured to receive commands from the Link 16 radio. The Link 16 terminal further includes a communication channel configured to facilitate communication between the red enclave and the black enclave. The Link 16 radio is configured to dynamically adjust when commands are sent to the Link 16 modem with respect to time slots specified in the commands based on latency between the Link 16 radio and the Link 16 modem.

18 Claims, 3 Drawing Sheets

(56) References Cited

U.S. PATENT DOCUMENTS

| | | | |
|---|---|---|---|
| 2017/0099585 A1* | 4/2017 | Wasserman | H04L 1/0057 |
| 2022/0104229 A1* | 3/2022 | Zacharias | H04L 43/0852 |
| 2022/0108207 A1* | 4/2022 | Graf | G06N 20/00 |
| 2022/0200915 A1* | 6/2022 | Timmons | H04L 47/2475 |
| 2022/0417117 A1* | 12/2022 | Tayeb | H04L 41/28 |
| 2023/0116163 A1* | 4/2023 | Scholz | H04L 45/70 |
| | | | 370/392 |
| 2025/0219787 A1* | 7/2025 | Gudimitla | H04L 25/0224 |

* cited by examiner

SPLIT RADIO TACTICAL DATA LINK TERMINAL

CROSS-REFERENCE TO RELATED APPLICATIONS

This application claims the benefit of and priority to U.S. Provisional Patent Application Ser. No. 63/406,605 filed on Sep. 14, 2022 and entitled "SPLIT RADIO TACTICAL DATA LINK TERMINAL," and which application is expressly incorporated herein by reference in its entirety.

BACKGROUND

Background and Relevant Art

Link 16 is a tactical data link network used by certain permitted nation state entities. Using Link 16, various military vehicles, personnel, and other entities can exchange tactical pictures in near real-time. Link 16 supports exchanging information including textual messages, images, and various different qualities of voice data. The information can include various combinations of the various types of information.

Link 16 is high speed with multiple data channels. This is accomplished using time division multiple access (TDMA) communications. Link 16 is jam resistant, detection resistant, and interception resistant. This is accomplished by Link 16 being implemented using a frequency division multiple access (FDMA) scheme which implements frequency hopping spread spectrum (FHSS).

Network time in Link 16 is comprised of time intervals referred to as epochs. Each epoch is 12.8 minutes long. Each epoch is divided into time slots that are each 7.8125 milliseconds wide. Frequency hopping, using the FDMA scheme, occurs every 7.8125 ms (i.e., at 128 Hz). The FDMA scheme hops between a series of 51 pseudo random selections of frequencies.

Before deployment, predetermined time slot assignments are loaded into Link 16 terminals to be deployed. The time slot assignments repeat for each epoch, and instruct each terminal with respect to radio frequency, message coding, and a mode of operation for the terminal during each time slot. The modes of operation include transmit, receive, or relay, and are defined for the duration of a given slot. The time slot assignments include identification of each slot, set values that define the first slot in the epoch, and the action recurrence rate defining how often an action assigned to the terminal for a given time slot repeats until the end of the epoch. All terminals participating in a Link 16 network use a common network time reference to communicate intelligible messages during their assigned slots.

When a Link 16 terminal is configured in a receiver mode, the terminal includes an antenna, configured to receive radio signals, which is coupled to an input of an input low noise amplifier. The output of the input low noise amplifier is coupled to a hard limited Minimum Shift Keying (MSK) receiver. The MSK receiver dwells on a determined frequency until the receiver detects a receive message preamble. Once a preamble is detected during a certain time slot, receive message data received during the time slot is detected by a signal processor. The signal processor performs error correction and other processing on the receive message data. The processor is coupled to a receiver input of a cryptographic subsystem. The receiver output of the cryptographic subsystem is coupled to a receiver input of a Link 16 application processor. The receiver output of the application processor is coupled to a receiver input of a host computer. The application processor sends decrypted receive data to the host computer, and/or processes the receive message data further depending on the receive message type. This process repeats for each time slot.

When a Link 16 terminal is configured in a transmitter mode, the host computer is coupled to a transmitter input of the application processor. The host computer sends transmit message data to the application processor. The application processor performs certain processing on the transmit message data. The application processor is coupled to a transmit input of the cryptographic subsystem. The cryptographic subsystem encrypts the transmit message data and sends the encrypted transmit message data to a transmit input of an MSK transmitter. A transmit output of the MSK transmitter dwells on a determined frequency according to an FDMA scheme for a particular slot to allow a particular transmit message scheduled for the particular slot to be transmitted. The MSK transmitter is coupled to a transmit input of a low noise amplifier. A transmit output of the low noise amplifier is coupled to an antenna for sending the transmit data. This process repeats for each transmit time slot.

Link 16 Terminals are certified by the National Security Agency (NSA) as Type 1 Cryptographic Units. Type 1 Cryptographic units are for encrypting and decrypting classified and sensitive national security information when appropriately keyed. In the field they are required to be protected as Controlled Cryptographic Items (CCI) (or classified units if Keyed). This leads to security protection/certification issues for the whole terminal, inasmuch as the terminal includes the cryptographic subsystem. That is, even though the terminal includes several different separate portions, all of those different separate portions of the terminal all have to be protected due to connections to each other even though only certain portions (e.g., the cryptographic subsystem) of the terminal cause the need for protection.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a Link 16 terminal. The Link 16 terminal includes a red enclave. The red enclave comprises a Link 16 radio. The Link 16 radio is configured to send commands to Link 16 modems. The commands specify time slots when operations in the commands should be performed by the Link 16 modems. The Link 16 terminal further includes a black enclave physically separated from the red enclave. The black enclave includes a Link 16 modem configured to receive commands from the Link 16 radio. The Link 16 terminal further includes a communication channel configured to facilitate communication between the red enclave and the black enclave. The Link 16 radio is configured to dynamically adjust when commands are sent to the Link 16 modem with respect to time slots specified in the commands based on latency between the Link 16 radio and the Link 16 modem.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein implement a system where a host computer and cryptographic subsystems are separated from the corresponding modem and antenna. The host computer and cryptographic subsystem can be held in a more physically secure environment than the modem and antenna. In particular modem and antenna deployments can be difficult and expensive to protect according to Federal Aviation Administration (FAA) and NSA requirements. This is due to the modems and antennas generally needing to be placed in exposed areas for functionality. By separating the host computer and cryptographic subsystems from the corresponding modem and antenna, the host computer and cryptographic subsystem can be protected to a degree complying with FAA and NSA requirements without requiring additional physical protections that are required for equipment deployed in exposed areas.

Previously, Link 16 terminals included colocation of a secure red enclave and an unsecure black enclave, where secure and unsecure are related to a level of data protection, such as encryption. Due to the red enclave and the black enclave being collocated, only a limited amount of time was needed to communicate between the red and black enclaves. Additionally, inasmuch as the red and black enclaves were a fixed distance from each other and given that communication techniques were consistent and unencumbered by complex data processing (such as encryption) between the enclaves, the latency between the red and black enclaves was essentially fixed.

Figure 1:
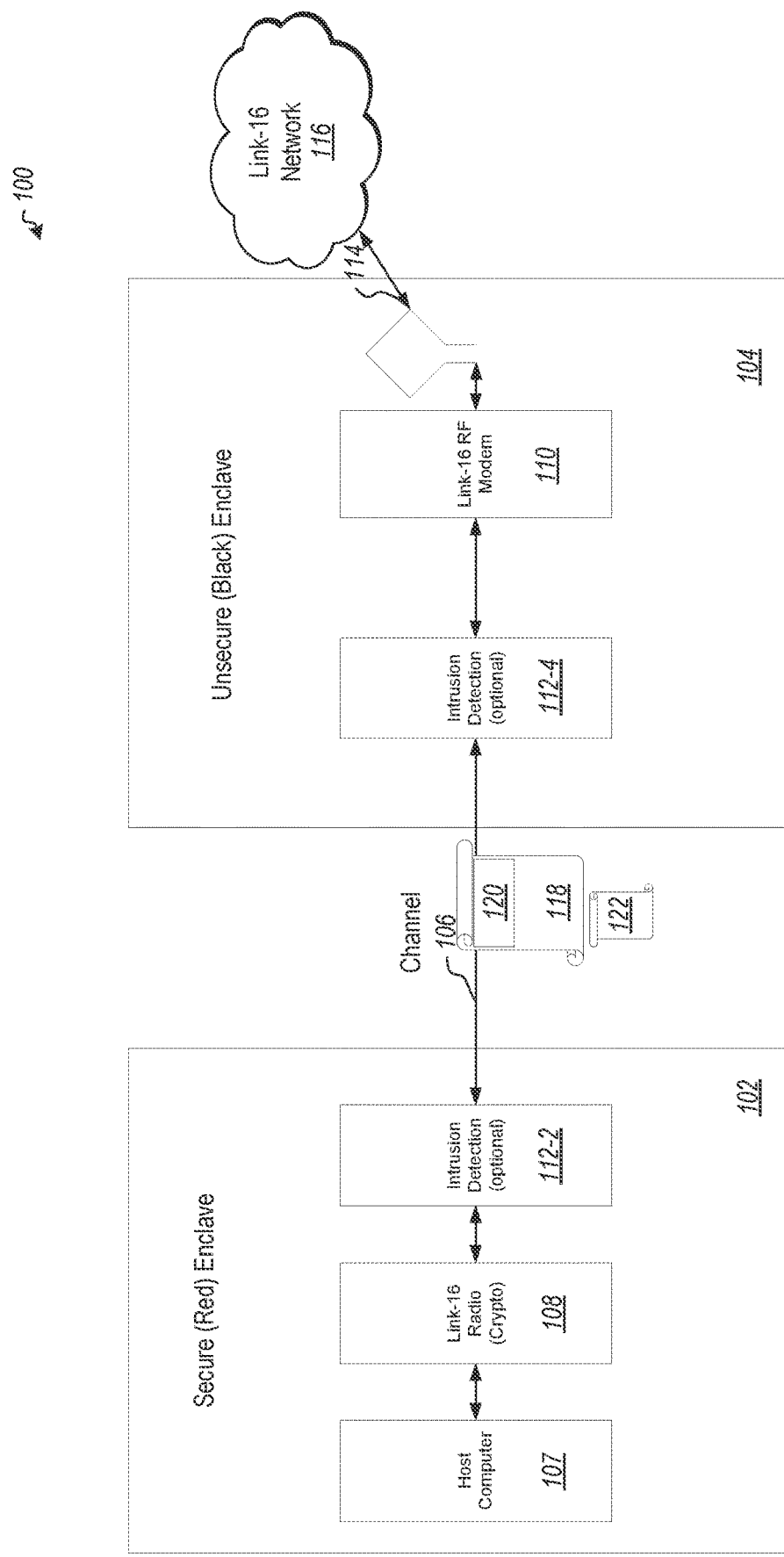
FIG. 1 illustrates a Link 16 terminal having physically separated red and black enclaves.

Referring to FIG. 1, an embodiment is illustrated where a terminal 100 includes a secure red enclave 102 physically separated from an unsecure black enclave 104. This allows the red enclave 102 to physically be located in a different location than the black enclave 104. However, this configuration presents a number of challenges. These challenges relate to delays in communication between the red enclave 102 and the black enclave 104. These challenges can be particularly problematic inasmuch as communications are performed between the enclaves using TDMA communications where certain communications commands to a modem are scheduled for a particular time slot. A command will specify an operation that the modem is to do in a particular time slot. For example, the command may specify sending certain data in a time slot. Alternatively, the command may specify that the modem should be configured for a receive operation on a particular network during a particular time slot. Etc.

If there is excessive delay, a command may be issued for a time slot by a host computer 107 and radio 108 at the red enclave 102 that arrives at the modem 110 of the black enclave 104 at a point where it is impossible to use the command in the time slot specified in the command. Thus, the command will be dropped. This can result in partial or full disruption of communications by the terminal 100.

One challenge causing delay relates to the degree of separation between the red enclave 102 and the black enclave 104. The further away the black enclave 104 is from the red enclave 102, the longer it takes for communications to be communicated on the communications channel 106 deployed between the red enclave 102 and the black enclave 104, using corresponding communication hardware at the red enclave 102 and black enclave 104. This can be particularly troublesome given that embodiments may be implemented where the distance between the red enclave and the black enclave can vary. That is, as a distance between the red enclave 102 and the black enclave 104 increases, commands from the radio 108 take longer to reach the modem 110, increasing the probability that a command will specify a time slot that is impossible for the modem 110 to comply with.

Another challenge causing delay relates to the characteristics of the channel 106 between the red enclave 102 and the black enclave 104. The channel 106 may be one or more of wired, wireless, SATCOM, RF, or optical. Weather conditions, geography, temperature, a dielectric constant of a medium of the channel 106, physical barriers, multipath characteristics, cloud cover, etc. may affect how long it takes for communications to travel on the channel 106 from the radio 108 to the modem 110. Again, this can create a situation increasing the probability that a command will specify a time slot that is impossible for the modem 110 to comply with.

Another challenge relates to configuration of the channel 106. For example, the channel 106 may be implemented as a mobile ad-hoc network (MANET), where multiple hops from node to node are used to implement the full channel 106 between the red enclave 102 and the black enclave 104. The more hops used to implement the channel 106, the longer communications between the red enclave 102 and the black enclave 104 take. Again, this can create a situation increasing the probability that a command will specify a time slot that is impossible for the modem 110 to comply with.

Another challenge relates to encryption of the channel 106. While communications on the channel 106 may not be classified, such communications may still be sensitive. Thus, some embodiments may encrypt communications between the red enclave 102 and the black enclave 104. In the example illustrated in FIG. 1, encryptors 112-2 and 112-4 are implemented at the red enclave 102 and black enclave 104 respectively. In some embodiments, the encryptors 112-2 and 112-4 may be IPS-250X or IPS-255X encryptors available from Viasat, Inc. of Carlsbad, California. When encryption is implemented, encryption and decryption operations add additional time from when commands are sent by the radio 108 to when the commands are received by the modem 110. Again, this can create a situation increasing the probability that a command will specify a time slot that is impossible for the modem 110 to comply with.

Embodiments illustrated herein are able to dynamically adjust time slot designations generated by the host computer 107 and/or radio 108 depending on an amount of delay caused by the channel 106. This allows commands to be sent from the red enclave 102 to the black enclave in a fashion that allows the commands to be used by the modem 110 and transmitted on the antenna 114 to a network 116. This allows the red enclave 102 to be separated from the black enclave 104 while still enabling desired functionality.

Previously, all Link 16 terminals have been built as single hardware devices with the whole terminal certified (both FAA and NSA). Embodiments illustrated herein allow for NSA certification of the CCI Red side and FAA Electromagnetic Compatibility (EMC-F) certification of the Black Side. Thus, embodiments split the terminal 100 into separate CCI and Black Side elements providing users and integrators significant leeway in design and deployment actions.

Embodiments divide the Link 16 terminal 100 receive and transmit into a CCI/Secure piece of hardware (i.e., the red enclave 102) and an unprotected Black RF piece of hardware (i.e., the black enclave 104) interconnected with a routed channel (e.g., a routed Internet Protocol (IP) capable channel). The routed channel can be through a network (with the appropriate protection accreditation). As such, a distance between the CCI and RF units (in the red enclave 102 and the black enclave respectively) can be significant (e.g., up to a 980-millisecond latency network connection). The CCI protected radio 108 connects to the user's classified host computer 107 and performs the cryptographic processing (TRANSEC Key stream production, Encryption/Decryption) as well as the Red Side Link 16 Message Processing while the RF unit, including the modem 110, does the black side Modulator Demodulator (MODEM) and RF functions between the routed channel 106 and the antenna connections to the antenna 114.

A unique element of an embodiment includes introduction of a network routed capability using the channel 106 between elements (including the radio 108 and modem 110) of what would normally be tightly connected elements of the Link 16 terminal 100. In particular, past terminals have used collocated short connections between radios and modems implemented in a single physical device, or at least in a collocated arrangement with devices occupying essentially the same space. Inasmuch as the red enclaves and black enclaves were directly coupled in the same location, there was no need for encryption between the two. Thus, timing issues historically were of less concern than in the embodiments illustrated herein. In particular, latencies were static and could be accounted for using a static schedule ahead policy.

Embodiments illustrated herein can manage the timing issues by using a dynamic schedule ahead scheduling scheme based on latency. This is a change from existing static schedule ahead.

FIG. 1 illustrates that the red enclave 102 sends a command 118 to the black enclave 104. In particular, the radio 108 generates and sends the command 118 where it is propagated to the channel 106 and on to the black enclave 104. The command specifies a time slot when the modem 110 should perform some action.

The command 118 includes a header 120. The header 120 includes a time. The time in the header 120 is a time, as kept by the radio 108, when the command 118 is sent by the radio 108. The time in the header 120 is related to TDMA network time. Thus, the command includes a time when the command 118 was sent, as well as an indication of a time slot when the command 118 should be implemented at the modem 110.

The modem 110 tracks network time in the TDMA network. The modem 110 measures time from when it receives the command 118 in the network. This means that time for the command to be encrypted by the encryptor 112-2, time for travel on the channel 106, and time for decrypting by the encryptor 112-4 will be factored into the time of when the modem 110 receives the command 118.

Thus, the command 118 will have a time specified in the header 120 that can be used for a one-way time measurement. The command 118 also specifies a time slot when the command 118 should be executed by the modem 110. The modem 110 (on the black enclave 104) performs a time difference operation by calculating how early it receives the command 118 with respect to the time slot. Thus, the radio 108 generates the command 118 and sends it to the modem 110 on the black enclave 104. The modem 110 receives the command 118 and determines that the command 118 is for a time slot "X". The modem 110 also determines a relationship between the network time and time slot "X". The relationship may be quantified, in some embodiments, in terms of time slots away from time slot "X". For example, in Link 16, time slots are 7.8125 milliseconds wide. Thus, in some embodiments, the modem 110 will measure a difference between the current TDMA network time and the time slot specified in the command 118 in terms of number of time slots away from the current TDMA network time. For example, the modem 110 may determine that the command 118 has arrived at time X-2 slots (meaning that the command has arrived 2 slots early).

In some embodiments, the modem performs the time difference operation to compute time difference as an average. For example, the modem 110 may perform the time difference operation for commands received over a last second time window, or some other appropriate time window. In some embodiments, this may be performed as a moving average over time. The modem 110 can provide an indicator 122 reporting the results of the time difference operation back to the radio 108. reports this back to the red enclave 102, and in particular to the radio 108, (where the commands are coming from).

The radio 108 implements a dynamic schedule ahead scheduling operation, using the indicator 122. In particular, the radio 108 may be configured to send the command 118 at a particular time with a particular slot specified based on the results in the indicator 122. The radio 108 sends the command 118 with a time slot specified at a time that gives sufficient time for the command to pass through (and be operated on by) the encryptor 112-2, over the channel 106, and through (and be operated on by) the encryptor 112-4, and still arrive with sufficient time to be used by the modem 110 during the slot specified in the command 118. That is, the terminal 100 attempts to ensure that the command 118 arrives before the time slot specified in the command 118 inasmuch as if the command 118 arrives after the time slot specified in the command 118, then the command 118 cannot be performed by the modem 110.

Indeed, embodiments may be implemented where the terminal 100 is configured to have the command 118 arrive at the modem 110 a predetermined number of time slots before the time slot specified in the command 118. For example, in one embodiment, the terminal 100 may be configured to attempt to have the command 118 arrive at the modem 110 on the order of 10 time slots before the operation specified in the command 118 will be performed by the modem 110. To attempt to meet this predetermined number, the radio 108 will adjust the amount of time it sends the command 118 ahead of the time slot specified in the command 118 based on the results in the indicator 122. For example, if the time difference operation indicates that the previous commands are arriving less than 10 time slots ahead of the time slot specified in the previous commands, then the radio 108 will send current commands at a time further from the time slot specified in the current commands (i.e., sooner) as compared to the previous commands and corresponding time slots.

Note also that commands that arrive prior to the time slot specified in the commands can be buffered at the modem 110. Additionally, the encryptors 112-2 and 112-4 and the channel 106 act as a buffer for commands. Note that there is a limited amount of buffering that can be performed, so it is desirable to not have commands arrive excessively early, with respect to the time slots specified in the commands, at the modem as there may simply not be sufficient buffering to store the commands.

Thus, the terminal 100 attempts to cause the commands to arrive at the modem in a fashion that avoids the commands arriving excessively early or late. Thus, in the illustrated example, if previous commands are arriving having time slots specified that are, on average, more than 10 time slots ahead of the current TDMA network time, the terminal 100 will attempt to cause the radio 108 to send current commands closer in time to the time slots specified in the current commands as compared to previous commands and their corresponding time slots.

Illustrating now a more detailed example, assume that the radio 108 is sending commands at a time that is 50 slots ahead of the time slots specified in the sent commands. The modem 110 provides indicators reporting the results of the time difference operation back to the radio 108 indicating that the commands are arriving at an average of 5 time slots ahead of when they are to be used by the modem 110. The radio 108, in response, sends subsequent commands at a time that is 55 time slots ahead of the time slots specified in the subsequent commands. On the other hand, if the modem 110 provides indicators reporting the results of the time difference operation back to the radio 108 indicating that the commands are arriving at an average of 20 time slots ahead of when they are to be used by the modem 110, the radio 108, in response, sends subsequent commands at a time that is 40 time slots ahead of the time slots specified in the subsequent commands.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
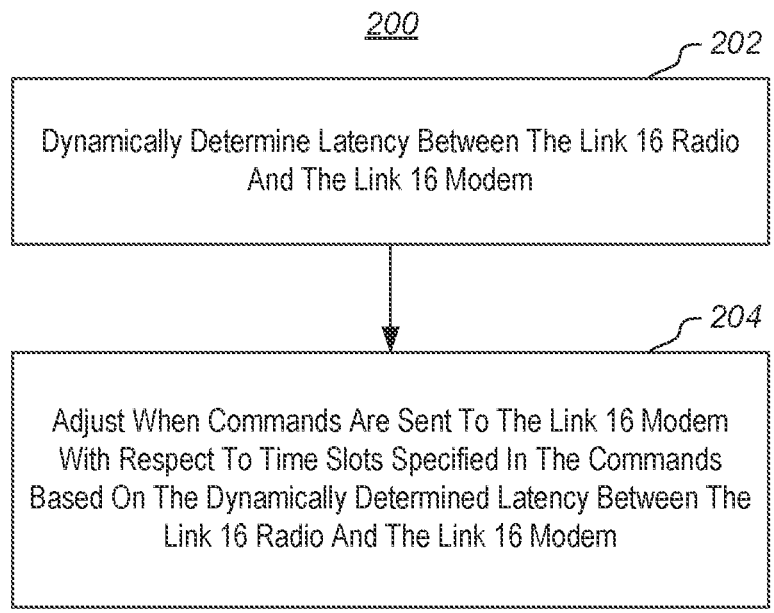
FIG. 2 illustrates a method of sending commands from a Link 16 radio at a red enclave of a Link 16 terminal to a modem at a black enclave of the Link 16 terminal, where the black enclave is physically separated from the red enclave.

Referring now to FIG. 2, a method 200 is illustrated. The method 200 includes acts for sending commands from a Link 16 radio at a red enclave of a Link 16 terminal to a modem at a black enclave of the Link 16 terminal, where the black enclave is physically separated from the red enclave. The method includes the red enclave dynamically determining latency between the Link 16 radio and the Link 16 modem (act 202). The method 200 further includes the red enclave dynamically adjusting when commands are sent to the Link 16 modem with respect to time slots specified in the commands based on the dynamically determined latency between the Link 16 radio and the Link 16 modem (act 204).

The method 200 may further include determining latency between the Link 16 radio and the Link 16 modem by measuring round trip time for communications between the Link 16 radio and the Link 16 modem. For example, the Link 16 radio may send a command 118 to the Link 16 modem 110. The Link 16 modem responds with an acknowledgement message to the Link 16 radio 108. The Link 16 radio 108 and/or the host computer 107 can use this information to determine latency between the Link 16 radio 108 and the Link 16 modem 110.

The method 200 may further include determining the latency between the Link 16 radio and the Link 16 modem by receiving an indicator from the Link 16 modem identifying how many slots ahead, from a time slot specified in a command, the command has been received from the Link 16 radio. For example, as illustrated in FIG. 1, the indicator 122 may be provided from the Link 16 modem 110 to the Link 16 radio 108.

The method 200 may further include determining the latency between the Link 16 radio and the Link 16 modem based on an act of averaging latency for a plurality of commands sent from the red enclave to the black enclave. Thus, for example, while FIG. 1 illustrates a single command 118, it may be appreciated that latency may be determined using a plurality of commands over a predetermined period of time.

The method 200 may further include encrypting and decrypting communications on a communication channel between the red enclave and the black enclave using encryption suitable for sensitive information but not suitable for classified information. Thus, for example, the encryptors 112-2 and 112-4 may be configured for sending sensitive information, but may not have encryption suitable for classified information classified by the NSA.

The method 200 wherein dynamically adjusting comprises performing a rough adjustment of a time when commands are sent to the Link 16 modem with respect to time slots specified in the commands. For example, the host computer 107 and/or the Link 16 radio may monitor for changing environmental conditions, changing distances between the red enclave 102 and the black enclave 104, changing channel (e.g., network) characteristics, changing number of hops in a MANET, or other changes, and may adjust when commands are sent to the Link 16 modem with respect to time slots specified in the commands accordingly. More granular adjustments may be made based on indicators such as indicator 122 or other more precise latency measurements.

The method 200 may further include performing an initial guess of the latency between the Link 16 radio and the Link 16 modem. This may be done as a coarse guess at latency when beginning sending commands between the red enclave 102 and the black enclave 104. This may be performed using information such as a known distance between the red enclave 102 and the black enclave, such as by using GPS or other positioning hardware at the enclaves, weather information, network conditions, number of hops between the red enclave 102 and the black enclave 104, or other information.

Figure 3:
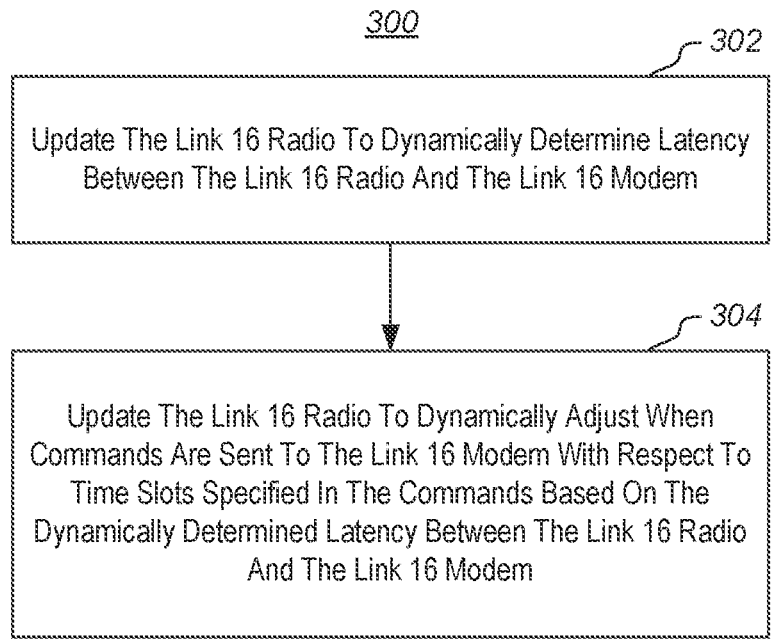
FIG. 3 illustrates a method of updating a Link 16 radio to perform dynamic send ahead rather than static send ahead for sending commands from the Link 16 radio at a red enclave of a Link 16 terminal to a modem at a black enclave of the Link 16 terminal, where the black enclave is physically separated from the red enclave.

Referring now to FIG. 3, a method 300 is illustrated. The method 300 includes acts for updating a Link 16 radio to perform dynamic send ahead rather than static send ahead for sending commands from the Link 16 radio at a red enclave of a Link 16 terminal to a modem at a black enclave of the Link 16 terminal, where the black enclave is physically separated from the red enclave. In particular, embodiments illustrated herein can be implemented where existing Link 16 hardware, where it was expected that the Link 16 radio and Link 16 modem were collocated, can be upgraded, such as by upgrading firmware, software, and/or other components to allow for the Link 16 radio and the Link 16 modem to be physically separated from each other. Thus, method 300 may be implemented in these cases.

Method 300 includes updating the Link 16 radio to dynamically determine latency between the Link 16 radio and the Link 16 modem (act 302).

Method 300 further includes updating the Link 16 radio to dynamically adjust when commands are sent to the Link 16 modem with respect to time slots specified in the commands based on the dynamically determined latency between the Link 16 radio and the Link 16 modem (act 304).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A Link 16 terminal, the Link 16 terminal comprising:
   a red enclave, wherein the red enclave comprises a Link 16 radio, wherein the Link 16 radio is configured to send commands to Link 16 modems, the commands specifying time slots when operations in the commands should be performed by the Link 16 modems;

a black enclave physically separated from the red enclave, the black enclave comprising a Link 16 modem configured to receive commands from the Link 16 radio;

a communication channel configured to facilitate communication between the red enclave and the black enclave; and wherein the Link 16 radio is configured to dynamically adjust when commands are sent to the Link 16 modem with respect to time slots specified in the commands based on latency between the Link 16 radio and the Link 16 modem;

wherein the Link 16 radio is configured to determine the latency between the Link 16 radio and the Link 16 modem by receiving an indicator from the Link 16 modem identifying how many slots ahead, from a time slot specified in a command, the command has been received from the Link 16 radio.

2. The Link 16 terminal of claim 1, wherein the Link 16 radio is configured to determine the latency between the Link 16 radio and the Link 16 modem by measuring round trip time for communications between the Link 16 radio and the Link 16 modem.

3. The Link 16 terminal of claim 1, wherein the Link 16 radio is configured to determine the latency between the Link 16 radio and the Link 16 modem based on an act of averaging latency for a plurality of commands sent from the red enclave to the black enclave.

4. The Link 16 terminal of claim 1, wherein the red enclave and the black enclave comprise encryptors configured to encrypt and decrypt communications on the communication channel between the red enclave and the black enclave using encryption suitable for sensitive information but not suitable for classified information.

5. The Link 16 terminal of claim 1, wherein the communication channel is at least one of wired, wireless, SATCOM, RF, or Optical.

6. The Link 16 terminal of claim 1, wherein the Link 16 radio is configured to perform a rough adjustment of a time when commands are sent to the Link 16 modem with respect to time slots specified in the commands.

7. The Link 16 terminal of claim 1, wherein the Link 16 radio is configured to perform an initial guess of the latency.

8. A method of sending commands from a Link 16 radio at a red enclave of a Link 16 terminal to a modem at a black enclave of the Link 16 terminal, where the black enclave is physically separated from the red enclave, the method comprising:

the red enclave dynamically determining latency between the Link 16 radio and the Link 16 modem;

the red enclave dynamically adjusting when commands are sent to the Link 16 modem with respect to time slots specified in the commands based on the dynamically determined latency between the Link 16 radio and the Link 16 modem; and determining the latency between the Link 16 radio and the Link 16 modem by receiving an indicator from the Link 16 modem identifying how many slots ahead, from a time slot specified in a command, the command has been received from the Link 16 radio.

9. The method of claim 8, further comprising determining latency between the Link 16 radio and the Link 16 modem by measuring round trip time for communications between the Link 16 radio and the Link 16 modem.

10. The method of claim 8, further comprising determining the latency between the Link 16 radio and the Link 16 modem based on an act of averaging latency for a plurality of commands sent from the red enclave to the black enclave.

11. The method of claim 8, further comprising encrypting and decrypting communications on a communication channel between the red enclave and the black enclave using encryption suitable for sensitive information but not suitable for classified information.

12. The method of claim 8, wherein dynamically adjusting comprises performing a rough adjustment of a time when commands are sent to the Link 16 modem with respect to time slots specified in the commands.

13. The method of claim 8, further comprising performing an initial guess of the latency between the Link 16 radio and the Link 16 modem.

14. A method of updating a Link 16 radio to perform dynamic send ahead rather than static send ahead for sending commands from the Link 16 radio at a red enclave of a Link 16 terminal to a modem at a black enclave of the Link 16 terminal, where the black enclave is physically separated from the red enclave, the method comprising:

updating the Link 16 radio to dynamically determine latency between the Link 16 radio and the Link 16 modem; and updating the Link 16 radio to dynamically adjust when commands are sent to the Link 16 modem with respect to time slots specified in the commands based on the dynamically determined latency between the Link 16 radio and the Link 16 modem.

15. The method of claim 14, further comprising updating the Link 16 radio to dynamically determine the latency between the Link 16 radio and the Link 16 modem by receiving an indicator from the Link 16 modem identifying how many slots ahead, from a time slot specified in a command, the command has been received from the Link 16 radio.

16. The method of claim 14, further comprising updating the Link 16 radio to dynamically determine the latency between the Link 16 radio and the Link 16 modem based on an act of averaging latency for a plurality of commands sent from the red enclave to the black enclave.

17. The method of claim 14, further comprising updating the Link 16 radio such that dynamically adjusting comprises performing a rough adjustment of a time when commands are sent to the Link 16 modem with respect to time slots specified in the commands.

18. The method of claim 14, further comprising updating the Link 16 radio to perform an initial guess of the latency between the Link 16 radio and the Link 16 modem.

* * * * *